United States Patent
Ishida et al.

(10) Patent No.: US 12,104,044 B2
(45) Date of Patent: Oct. 1, 2024

(54) FIBER-REINFORCED THERMOPLASTIC RESIN FILAMENT FOR 3D PRINTER, AND MOLDED ARTICLE THEREOF

(71) Applicant: Toray Industries, Inc., Tokyo (JP)

(72) Inventors: Shoma Ishida, Nagoya (JP); Koji Suzuki, Nagoya (JP); Yoshihiro Naruse, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 557 days.

(21) Appl. No.: 17/433,647

(22) PCT Filed: Apr. 3, 2020

(86) PCT No.: PCT/JP2020/015294
§ 371 (c)(1),
(2) Date: Aug. 25, 2021

(87) PCT Pub. No.: WO2020/217929
PCT Pub. Date: Oct. 29, 2020

(65) Prior Publication Data
US 2022/0145047 A1    May 12, 2022

(30) Foreign Application Priority Data

Apr. 25, 2019 (JP) ................................ 2019-084176
Apr. 25, 2019 (JP) ................................ 2019-084177
Apr. 25, 2019 (JP) ................................ 2019-084178
Apr. 25, 2019 (JP) ................................ 2019-084179

(51) Int. Cl.
| | |
|---|---|
| C08K 7/14 | (2006.01) |
| B33Y 70/10 | (2020.01) |
| C08L 35/02 | (2006.01) |
| C08L 61/02 | (2006.01) |
| C08L 81/04 | (2006.01) |
| B33Y 10/00 | (2015.01) |
| B33Y 80/00 | (2015.01) |
| C08K 3/04 | (2006.01) |
| C08K 3/40 | (2006.01) |

(52) U.S. Cl.
CPC ............... *C08K 7/14* (2013.01); *B33Y 70/10* (2020.01); *C08L 35/02* (2013.01); *C08L 61/02* (2013.01); *C08L 81/04* (2013.01); *B33Y 10/00* (2014.12); *B33Y 80/00* (2014.12); *C08K 3/04* (2013.01); *C08K 3/40* (2013.01); *C08L 2205/16* (2013.01); *C08L 2207/04* (2013.01)

(58) Field of Classification Search
CPC ... C08K 7/14; C08K 3/04; C08K 3/40; B33Y 70/10; B33Y 10/00; B33Y 80/00; C08L 35/02; C08L 61/02; C08L 81/04; C08L 2205/16; C08L 2207/04
USPC ......................................................... 524/494
See application file for complete search history.

(56) References Cited

U.S. PATENT DOCUMENTS

| | | |
|---|---|---|
| 2007/0003656 A1 | 1/2007 | LaBossiere et al. |
| 2014/0291886 A1 | 10/2014 | Mark et al. |
| 2018/0093413 A1 | 4/2018 | Yuasa et al. |
| 2020/0016844 A1 | 1/2020 | Koshi et al. |

FOREIGN PATENT DOCUMENTS

| | | | |
|---|---|---|---|
| CN | 109642036 A | 4/2019 | |
| EP | 3 409 452 A1 | 12/2018 | |
| EP | 3 653 362 A1 | 5/2020 | |
| JP | H05-50434 A | 3/1993 | |
| JP | 2009-500194 A | 1/2009 | |
| JP | 2013-026171 A | 2/2013 | |
| JP | 2016-518267 A | 6/2016 | |
| JP | 2017-128072 A | 7/2017 | |
| JP | 2019-018399 A | 2/2019 | |
| WO | WO-2015046290 A1 * | 4/2015 | ........... B29B 15/125 |

OTHER PUBLICATIONS

Notice of Reasons for Refusal dated May 9, 2023, of counterpart Japanese Patent Application No. 2021-515937, along with an English translation.
First Office Action dated Jan. 5, 2023, of counterpart Chinese Patent Application No. 202080030120.X, along with an English machine translation.
Extended European Search Report dated Dec. 16, 2022, of counterpart European Patent Application No. 20794098.2.

* cited by examiner

*Primary Examiner* — Brent T O'Hern
(74) *Attorney, Agent, or Firm* — DLA Piper LLP (US)

(57) ABSTRACT

A fiber-reinforced thermoplastic resin filament for a 3D printer is formed by impregnating a thermoplastic resin into a plurality of continuous reinforcing fibers, wherein: an average value S of a roundness parameter s of a cross section is 60% to 100%, the average value S being evaluated by (i) taking a photograph of the cross section perpendicular to the axial direction of the filament, (ii) drawing an inscribed circle and a circumscribed circle of the filament in a cross-sectional image and determining the diameter length of each, (iii) calculating the roundness parameter s defined by equation (1), and (iv) repeating (i)-(iii) at a plurality of locations on the filament and calculating the average value S of the roundness parameter s; and the coefficient of variation of the diameter length of the circumscribed circle is 0% to 10%.

12 Claims, No Drawings

US 12,104,044 B2

FIBER-REINFORCED THERMOPLASTIC RESIN FILAMENT FOR 3D PRINTER, AND MOLDED ARTICLE THEREOF

TECHNICAL FIELD

This disclosure relates to a fiber-reinforced thermoplastic resin filament for a 3D printer and a molded article thereof.

BACKGROUND

Since a fiber-reinforced thermoplastic resin base material, which is made by impregnating a thermoplastic resin into a plurality of continuous reinforcing fibers, is excellent in specific strength and specific rigidity, high in weight reduction effect and, in addition, high in heat resistance and chemical resistance, it is preferably used in various applications such as transportation devices such as aircraft and automobiles, industrial applications, sports, electric/electronic parts (for example, JP-A-2013-26171, JP-HEI 5-50434). In recent years, due to the increasing demand for weight reduction, replacement of metal parts with resin parts and the miniaturization and modularization of parts are progressing mainly for aircraft and automobile applications and, therefore, it is required to develop a material excellent in molding processability and mechanical properties.

In recent years, as a molding method of a fiber-reinforced thermoplastic resin base material, a molding method in which a thermoplastic resin is melt-laminated such as a 3D printing method, has attracted attention. The method of forming a shape while melt-laminating a thermoplastic resin, because of being advantageous in cost, has been developed in various fields (for example, JP-A-2009-500194). For a fiber-reinforced thermoplastic resin base material applied to such a molding method, a method of extruding reinforcing fibers cut into short fibers together with a thermoplastic resin to produce fiber-reinforced thermoplastic resin strands has been mainly employed. However, since the short fiber-reinforced thermoplastic resin base material is difficult to increase its fiber content and the fiber length is short, the reinforcement effect is limited.

As a method of exhibiting a high reinforcement effect, a method of applying a continuous fiber-reinforced thermoplastic resin base material has been studied as shown in JP-A2017-128072.

However, in the method shown in JP '072, because many voids are contained in an interior at a stage before molding, the voids must be removed at the time of molding by a 3D printer, and there are problems in quality and productivity of a 3D printer molded article.

Further, in a 3D printer, whereas in a usual FDM (Fused Deposition Modeling) method (Fused Deposition Modeling system), at the time of modeling, a thermoplastic resin filament is molten and stored in a nozzle and thereafter it is discharged, since when modeling a thermoplastic resin filament containing continuous fibers, if it is stored in a nozzle, the continuous fibers are clogged in the nozzle, it is necessary to model the molten continuous fiber-reinforced thermoplastic resin filament as it is without storing it. From this reason, if the thickness and shape of the continuous fiber-reinforced thermoplastic resin filament are not stable, there is a problem that clogging occurs during the process or in the nozzle, and the amount of modeling is not stable.

In view of such a background, it could be helpful to provide a fiber-reinforced thermoplastic resin filament for a 3D printer that is excellent in roundness and void ratio and in qualities such as dispersibility and straightness of reinforcing fibers, and excellent in process passability and modeling stability at the time of molding by a 3D printer, and a molded article thereof.

SUMMARY

We thus provide:

[1] A fiber-reinforced thermoplastic resin filament for a 3D printer formed by impregnating a thermoplastic resin into a plurality of continuous reinforcing fibers, wherein an average value S of a roundness parameter s of a cross section evaluated by the following method is 60% to 100%, and a coefficient of variation of diameter lengths of circumscribed circles, which are bases of a plurality of roundness parameters s used for calculating the average value S, is 0% to 10%:

(i) taking a photograph of a cross section perpendicular to an axial direction of the fiber-reinforced thermoplastic resin filament for a 3D printer,
(ii) drawing an inscribed circle and a circumscribed circle of the filament in a cross-sectional image and determining each diameter length,
(iii) calculating the roundness parameter s defined by the following equation (1), and
(iv) repeating the procedures (i)-(iii) at a plurality of locations on the fiber-reinforced thermoplastic resin filament for a 3D printer and calculating the average value S of the roundness parameter s.

$$\text{roundness parameter } s = \text{a diameter of the inscribed circle/a diameter of the circumscribed circle} \times 100 \quad (1)$$

[2] A fiber-reinforced thermoplastic resin filament for a 3D printer formed by impregnating a thermoplastic resin into a plurality of continuous reinforcing fibers, wherein a rate, in which absolute values of orientation angles of the reinforcing fibers with respect to an axial direction of the filament are in a range of 0 to 4 degrees, is 90% or more relative to the total.

[3] The fiber-reinforced thermoplastic resin filament for a 3D printer according to [1], wherein a coefficient of variation of a plurality of roundness parameters s used for calculating the average value S is 10% or less.

[4] The fiber-reinforced thermoplastic resin filament for a 3D printer according to any one of [1] to [3], wherein conditions of the following (a) to (c) are satisfied:
(a) a volume ratio of the reinforcing fibers in the fiber-reinforced thermoplastic resin filament for a 3D printer is 15 to 80%, and a volume ratio of the thermoplastic resin is 85 to 20%,
(b) a thickness of the fiber-reinforced thermoplastic resin filament for a 3D printer is 0.01 to 3 mm, and
(c) a filament length of the fiber-reinforced thermoplastic resin filament for a 3D printer is 1 m or more.

[5] The fiber-reinforced thermoplastic resin filament for a 3D printer according to any one of [1] to [4], wherein a porosity is 10% or less.

[6] The fiber-reinforced thermoplastic resin filament for a 3D printer according to any one of [1] to [5], wherein the reinforcing fibers are at least one selected from the group consisting of carbon fibers, glass fibers and aramid fibers.

[7] The fiber-reinforced thermoplastic resin filament for a 3D printer according to any one of [1] to [6], wherein the thermoplastic resin is at least one selected from the group consisting of polyphenylene sulfide (PPS) resin, polyetherimide (PEI) resin, polyphenylene ether ether ketone (PEEK) resin, polyphenylene ether ketone (PEK) resin and polyether ketone ketone (PEKK) resin.

[8] The fiber-reinforced thermoplastic resin filament for a 3D printer according to any one of [1] to [7], wherein an average value D of a dispersion parameter d (%) of the reinforcing fibers evaluated by the following method is 90% or more:
(i) taking a photograph of a cross section perpendicular to an axial direction of the fiber-reinforced thermoplastic resin filament for a 3D printer so that the entire cross section of the filament is taken,
(ii) dividing the entire cross-sectional image into square units each having a length of one side defined by the following equation (2),
(iii) calculating the dispersion parameter d (%) defined by the following equation (3), and
(iv) repeating the procedures (i)-(iii) at a plurality of locations on the fiber-reinforced thermoplastic resin filament for a 3D printer and calculating the average value D of the dispersion parameter d (%).

$1.5a \leq t \leq 2.5a$ ($a$: fiber diameter, $t$: length of one side of the unit)     (2)

dispersion parameter $d$ (%)=number of units each containing a reinforcing fiber in an evaluation zone/total number of units each containing any part of the filament in an evaluation zone×100     (3)

[9] The fiber-reinforced thermoplastic resin filament for a 3D printer according to [8], wherein a coefficient of variation of a plurality of dispersion parameters d used for calculating the average value D is 4% or less.
[10] The fiber-reinforced thermoplastic resin filament for a 3D printer according to any one of [1] to [9], wherein a thermoplastic resin layer is provided in at least a part of an outer periphery of the filament, and a volume ratio of the thermoplastic resin layer present in at least a part of the outer periphery of the filament is 50% or less with respect to the total volume of the fiber-reinforced thermoplastic resin filament.
[11] The fiber-reinforced thermoplastic resin filament for a 3D printer according to any one of [1] to [10], wherein the thermoplastic resin is a thermoplastic polymer alloy resin.
[12] The fiber-reinforced thermoplastic resin filament for a 3D printer according to [11], wherein a structural period of the polymer alloy is a both-phase continuous structure of 0.001 to 10 μm, or the polymer alloy contains a polymer alloy forming a sea-island structure comprising a sea phase and an island phase with a particle size of 0.001 to 10 μm.
[13] A molded article obtained by using a fiber-reinforced thermoplastic resin filament for a 3D printer according to any one of [1] to [12].

Since the fiber-reinforced thermoplastic resin filament for a 3D printer, formed by impregnating a thermoplastic resin into a plurality of continuous reinforcing fibers, is excellent in process passability and modeling stability at the time of molding because its high roundness, has a filament length of a certain length or more, is high in fiber content, and is excellent in quality such as void ratio and uniformity and straightness of reinforcing fibers, a molded article obtained using this can be expected to have a high reinforcement effect.

DETAILED DESCRIPTION

Our filaments and molded articles will be explained in detail together with examples.

Our fiber-reinforced thermoplastic resin filament for a 3D printer is formed by impregnating a thermoplastic resin into a plurality of continuous reinforcing fibers.

The continuous reinforcing fibers means those in which the reinforcing fibers are substantially uninterrupted in the fiber-reinforced thermoplastic resin. Although it is ideal that all the single fibers in the filament are not interrupted, if 80% or more of the single fibers are not interrupted, it can be referred to as a state being "uninterrupted." As the form and arrangement of the reinforcing fibers, for example, exemplified are those aligned in one direction, braids, tows and the like. In particular, it is preferred that the reinforcing fibers are arranged in one direction because the mechanical properties in a specific direction can be efficiently enhanced.

The kind of the reinforcing fibers is not particularly limited, and inorganic fibers such as carbon fibers, metal fibers and organic fibers can be exemplified. Two or more kinds of these may be used.

As the carbon fibers, for example, PAN-based carbon fibers made from polyacrylonitrile (PAN) fibers as raw material, pitch-based carbon fibers made from petroleum tar or petroleum pitch as raw material, and cellulose-based carbon fibers made from viscose rayon or cellulose acetate or the like as raw material, gas-phase growth-based carbon fibers made from hydrocarbons as raw material, and graphitized fibers thereof and the like, can be exemplified. Among these carbon fibers, PAN-based carbon fibers are preferably used because they have an excellent balance between strength and elastic modulus.

As the metal fibers, fibers comprising a metal such as iron, gold, silver, copper, aluminum, brass, or stainless steel can be exemplified.

As the organic fibers, for example, fibers comprising an organic material such as aramid, polybenzoxazole (PBO), polyphenylene sulfide, polyester, polyamide or polyethylene can be exemplified. As the aramid fibers, for example, para-type aramid fibers excellent in strength and elastic modulus, and meta-type aramid fibers excellent in flame retardancy and long-term heat resistance, can be exemplified. As the para-type aramid fibers, for example, polyparaphenylene terephthalamide fibers, copolyparaphenylene-3, 4'-oxydiphenylene terephthalamide fibers and the like can be exemplified, and as the meta-type aramid fibers, polymetaphenylene isophthalamide fibers and the like can be exemplified. As the aramid fibers, para-type aramid fibers having a higher elastic modulus than the meta-type aramid fibers are preferably used.

As the other inorganic fibers, for example, fibers made from an inorganic material such as glass, basalt, silicon carbide, and silicon nitride can be exemplified. As the glass fibers, for example, E glass fibers (for electricity), C glass fibers (for corrosion resistance), S glass fibers, T glass fibers (high strength and high elastic modulus), or the like can be exemplified. The basalt fibers are fibers made by making a basalt, which is a mineral, into fibers and have a very high heat resistance. The basalt generally contains 9 to 25% by weight of FeO or $FeO_2$ which is a compound of iron and 1 to 6% by weight of TiO or $TiO_2$ which is a compound of titanium, and it can also be made fibrous at a state of being molten and increasing the content of these components.

Since the fiber-reinforced thermoplastic resin filament in the example is often expected to serve as a reinforcing material, it is desirable to exhibit high mechanical properties, and to exhibit high mechanical properties, it is preferred to contain carbon fibers as reinforcing fibers.

In a fiber-reinforced thermoplastic resin filament, the reinforcing fibers are usually formed by arranging one or a plurality of reinforcing fiber bundles each in which a large number of single fibers are bundled. The number of single fibers of reinforcing fibers when one or a plurality of reinforcing fiber bundles are arranged is preferably 500 to 50,000. From the viewpoint of handleability, the number of single fibers of reinforcing fibers is more preferably 1,000 to 50,000, further preferably 1,000 to 40,000, and particularly preferably 1,000 to 30,000. The upper limit of the number of single fibers of reinforcing fibers may be such that the dispersibility and handleability can be kept good in consideration of the balance between the quality such as voids and dispersibility and the handleability.

The fiber-reinforced thermoplastic resin filament can be coated with a thermoplastic resin on the outermost layer. By coating the outer periphery with a thermoplastic resin, it is possible to improve the adhesiveness at the time of molding. The resin to be coated may be the same resin as the fiber-reinforced thermoplastic resin filament, or may be a different resin.

In the fiber-reinforced thermoplastic resin filament, it is preferred that a thermoplastic resin layer is provided in at least a part of the outer periphery of the filament, and the volume ratio of the thermoplastic resin layer present in at least a part of the outer periphery of the filament is 50% or less with respect to the total volume of the fiber-reinforced thermoplastic resin filament. The presence of the resin layer on the outer periphery of the filament can improve the adhesiveness between the filaments during 3D printing modeling (horizontal direction or vertical direction).

The thermoplastic resin layer may be in a state of completely covering the outer periphery of the filament, or may be partially present on the outer periphery. Further, the thermoplastic resin layer to be coated may be the same thermoplastic resin as the fiber-reinforced thermoplastic resin filament, or may be a different thermoplastic resin.

If the volume ratio of the thermoplastic resin layer present in at least a part of the outer periphery of the filament becomes too large with respect to the total volume of the fiber-reinforced thermoplastic resin filament, a material breakage occurs at the time of modeling at a portion of a resin layer in which the reinforcing fibers are not present, and if the ratio is too small, the effect of improving the adhesiveness between the filaments becomes small. Therefore, the volume ratio of the thermoplastic resin layer is preferably 50% or less with respect to the total volume of the fiber-reinforced thermoplastic resin filament, more preferably 20% or less, and further preferably 10% or less. Although the lower limit is not particularly limited, it is preferably 1% or more.

The ratio of the thermoplastic resin layer was evaluated by observing the cross section of the fiber-reinforced thermoplastic resin filament in the thickness direction as follows.

Evaluation Method

A sample in which the fiber-reinforced thermoplastic resin filament of a specimen was embedded in an epoxy resin was prepared, and the sample was polished until a cross section perpendicular to the axial direction of the fiber-reinforced thermoplastic resin filament could be observed well. The polished sample was photographed using a ultra-depth color 3D shape measuring microscope VHX-9500 (controller section)/VHZ-100R (measuring section) (supplied by Keyence Co., Ltd.), at a magnification of 300 times.

In the cross-sectional image photographed, the cross-sectional area of the fiber-reinforced thermoplastic resin filament and the area of the thermoplastic resin layer are determined, and the volume ratio of the thermoplastic resin layer is calculated by equation (9). This was carried out in three cross sections, and the arithmetic average value was taken as the volume ratio of the thermoplastic resin layer.

Volume ratio of thermoplastic resin layer (%)=100× (total area of thermoplastic resin layer)/(total area of fiber-reinforced thermoplastic resin filament) (9)

When an interface of the thermoplastic resin layer is hardly determined from the cross-sectional photograph, a circumscribed circle is drawn based on a reinforcing fiber present at an outermost location of the fiber-reinforced thermoplastic resin filament, a portion inside that is referred to as a fiber-reinforced thermoplastic resin filament portion, and a portion outside that is referred to as a thermoplastic resin layer, thereby determining the above-described volume ratio of the thermoplastic resin layer.

One reinforcing fiber bundle is preferably one formed by bundling 500 to 50,000 single fibers of reinforcing fibers which have an average diameter of 5 to 10 μm.

In the fiber-reinforced thermoplastic resin filament, it is preferred that the thermoplastic resin is a polymer alloy. By using a thermoplastic polymer alloy resin, impregnation property, mechanical properties and adhesiveness can be improved. For example, by forming the thermoplastic resin as a polymer alloy comprising a high-viscosity thermoplastic resin and a low-viscosity thermoplastic resin, high mechanical properties and impregnation property can be both achieved. Further, by forming the thermoplastic resin as a polymer alloy in which a resin having a high toughness is combined, the interlayer strength when the fiber-reinforced thermoplastic resin filament is modeled is improved.

As the thermoplastic resin, for example, exemplified are polyesters such as polyethylene terephthalate (PET) resin, polybutylene terephthalate (PBT) resin, polytrimethylene terephthalate (PTT) resin, polyethylene naphthalate (PEN) resin and liquid crystal polyester resin, polyolefins such as polyethylene (PE) resin, polypropylene (PP) resin and polybutylene resin, styrene-based resin, polyoxymethylene (POM) resin, polyamide (PA) resin, polycarbonate (PC) resin, polymethylene methacrylate (PMMA) resin, polyvinyl chloride (PVC) resin, polyphenylene sulfide (PPS) resin, polyphenylene ether (PPE) resin, modified PPE resin, polyimide (PI) resin, polyamideimide (PAI) resin, polyetherimide (PEI) resin, polysulfone (PSU) resin, modified PSU resin, polyethersulfone resin, polyketone (PK) resin, polyetherketone (PEK) resin, polyether ether ketone (PEEK) resin, polyether ketone (PEKK) resin, polyarylate (PAR) resin, polyether nitrile resin, phenol-based resin, phenoxy resin, fluorine-based resins such as polytetrafluoroethylene resin, and further, thermoplastic elastomers such as polystyrene-based resin, polyolefin-based resin, polyurethane-based resin, polyester-based resin, polyamide-based resin, polybutadiene-based resin, polyisoprene-based resin and fluorine-based resins, and a copolymer, a modified product or a resin blended with two or more kinds of these may be employed. In particular, from the viewpoint of heat resistance and long-term durability, polyphenylene sulfide resin, polyarylene ether ketone resin, polyetherimide resin, polyether sulfone resin, and liquid crystal polymer resin are more preferable.

As the above-described polyarylene ether ketone (PAEK) resin, for example, exemplified are polyether ketone (PEK), polyether ether ketone (PEEK), polyether ether ketone ketone (PEEKK), polyether ketone ketone (PEKK), polyether ketone ether ketone ketone (PEKEKK), polyether ether ketone ether ketone (PEEKEK), polyether ether ether ketone (PEEEK), polyether diphenyl ether ketone (PEDEK)

and the like, and a copolymer, a modified product or a resin blended with two or more kinds of these may be employed.

With respect to the polymer alloy forming the thermoplastic resin, it is preferred that in the fiber-reinforced thermoplastic resin filament, the polymer alloy forms a both-phase continuous structure with a structural period of 0.001 to 10 μm, or the polymer alloy forms a sea-island structure comprising a sea phase and an island phase with a particle size in the range of 0.001 to 10 μm. By controlling to a both-phase continuous structure with a structural period of 0.001 to 10 μm or a sea-island structure comprising a sea phase and an island phase with a particle size in the range of 0.001 to 10 μm, high mechanical properties and heat resistance can be exhibited. It is more preferred to form a both-phase continuous structure in the range of 0.01 to 5 μm or a sea-island structure comprising a sea phase and an island phase with a particle size in the range of 0.01 to 5 μm, further preferably a both-phase continuous structure in the range of 0.1 to 1 μm or a particle size in the range of 0.05 to 1 μm.

Further, to confirm these both-phase continuous structure or dispersion structure, it is important to confirm a regular periodic structure. This is because, for example, in addition to confirming that a both-phase continuous structure is formed by observation with an optical microscope or a transmission electron microscope, it is necessary to confirm that a scattering maximum appears in a scattering measurement performed using a small-angle X-ray scattering device or a light scattering device. The presence of the scattering maximum in the scattering measurement is a proof of having a regular phase separation structure with a certain period, the period Λm (nm) corresponds to a structural period in the both-phase continuous structure and corresponds to a distance between particles in the dispersion structure. Further, the value thereof can be calculated by equation (11) using a wavelength in a scattering body of the scattered light λ (nm) and a scattering angle θm (deg °) giving the scattering maximum.

$$\Lambda m = (\lambda/2)/\sin(\theta m/2) \quad (11)$$

Further, even if the size of the structural period in the both-phase continuous structure or the distance between particles in the dispersion structure is within the above-described range, if there is a partially structurally coarse portion, it is possible that the properties of the original polymer alloy may not be obtained, for example, such as when an impact is received, that portion becomes a starting point, and destruction progresses. Therefore, uniformity of the structural period in the both-phase continuous structure or the distance between particles in the dispersion structure becomes important. This uniformity can be evaluated by the small-angle X-ray scattering measurement or the light scattering measurement for the polymer alloy described above. Since the size of the phase-separation structure that can be analyzed differs between the small-angle X-ray scattering measurement and the light scattering measurement, it is necessary to use them appropriately in accordance with the phase-separation structure size of the polymer alloy to be analyzed. In the small angle X-ray scattering measurement and the light scattering measurement, in addition to the size of the structural period in the both-phase continuous structure or the distance between particles in the dispersion structure, the distribution information thereof can be obtained. Concretely, the peak position of the maximum scattering in the spectrum obtained by these measurements, that is, the scattering angle θm (deg °), corresponds to the size of the structural period in the both-phase continuous structure or the distance between particles in the dispersion structure, and the spreading manner of the peak corresponds to the uniformity of the structure. To obtain excellent physical properties such as mechanical properties, it is preferred that the structural uniformity is high, and the polymer alloy is characterized in that the scattering spectrum obtained by the small-angle X-ray scattering measurement or the light scattering measurement has a maximum value.

The fiber-reinforced thermoplastic resin filament is formed by impregnating the aforementioned thermoplastic resin into a plurality of continuous reinforcing fibers, and as needed, fillers, other kinds of polymers, various kinds of additives or the like may be contained.

As the fillers, arbitrary one of those used generally as fillers for resins can be used, and the strength, rigidity, heat resistance and dimensional stability of a fiber-reinforced thermoplastic resin base material and a molded article using the same can be more improved. As the fillers, for example, fibrous inorganic fillers such as glass fiber, carbon fiber, potassium titanate whisker, zinc oxide whisker, aluminum borate whisker, aramid fiber, alumina fiber, silicon carbide fiber, ceramic fiber, asbestos fiber, stone wool fiber and metal fiber, non-fibrous inorganic fillers such as wollastonite, zeolite, sericite, kaolin, mica, talc, clay, pyrophyllite, bentonite, montmorillonite, asbestos, aluminosilicate, alumina, silicon oxide, magnesium oxide, zirconium oxide, titanium oxide, iron oxide, calcium carbonate, magnesium carbonate, dolomite, calcium sulfate, barium sulfate, magnesium hydroxide, calcium hydroxide, aluminum hydroxide, glass beads, ceramic beads, boron nitride and silicon carbide and the like, can be exemplified. Two or more of these may be contained. These fillers may be hollow. Further, it may be treated with a coupling agent such as an isocyanate-based compound, an organic silane-based compound, an organic titanate-based compound, an organic borane-based compound, and an epoxy compound. Further, as the montmorillonite, organic montmorillonite in which the interlayer ions are cation-exchanged with an organic ammonium salt may be used. If the fibrous filler comprises discontinuous fibers, the function can be imparted without impairing the reinforcement effect of the reinforcing fibers made of continuous fibers.

As the various kinds of additives, for example, exemplified are antioxidants and heat-resistant stabilizers (hindered phenol-based, hydroquinone-based, phosphite-based and their substitutes, copper halides, iodine compounds and the like), weather-resistant agents (resorcinol-based, salicylate-based, benzotriazole-based, benzophenone-based, hindered amine-based and the like), releasing agents and lubricants (aliphatic alcohol, aliphatic amide, aliphatic bis-amide, bisurea, polyethylene wax and the like), pigments (cadmium sulfide, phthalocyanine, carbon black and the like), dyes (nigrosine, aniline black and the like), plasticizers (p-oxybenzoate octyl, N-butylbenzene sulfonamide and the like), antistatic agents (alkyl sulfate type anionic antistatic agents, quaternary ammonium salt type cationic antistatic agents, non-ionic antistatic agents such as polyoxyethylene sorbitan monostearate, betaine-based amphoteric antistatic agents and the like), flame retardants (hydroxides such as melamine cyanurate, magnesium hydroxide and aluminum hydroxide, poly-phosphorus acid ammonium, brominated polystyrene, brominated polyphenylene oxide, brominated polycarbonate, brominated epoxy resin, or a combination of these brominated flame retardants and antimony trioxide and the like) and the like. Two or more of these may be compounded.

The fiber-reinforced thermoplastic resin filament can be obtained by impregnating a thermoplastic resin into a plurality of continuous reinforcing fibers, and as the impregnation method, for example, exemplified are a film method of melting a film-shaped thermoplastic resin and impregnating the thermoplastic resin into a reinforcing fiber bundle by pressurizing it, a commingle method of mixing a fibrous thermoplastic resin and a reinforcing fiber bundle, and then melting the fibrous thermoplastic resin, and impregnating the thermoplastic resin into the reinforcing fiber bundle by pressurizing it, a powder method of dispersing powdered thermoplastic resin in the gaps between the fibers in the reinforcing fiber bundle, and then melting the powdered thermoplastic resin, and impregnating the thermoplastic resin into the reinforcing fiber bundle by pressurizing it, and a pultrusion method of immersing the reinforcing fiber bundle in molten thermoplastic resin, and impregnating the thermoplastic resin into the reinforcing fiber bundle by pressurizing it. The pultrusion method is preferable because a variety of fiber-reinforced thermoplastic resin filaments with various thicknesses and fiber volume contents can be produced.

In the fiber-reinforced thermoplastic resin filament, it is necessary that an average value S of a roundness parameter s of a cross section evaluated by the following method is 60% or more, and a coefficient of variation of diameter lengths of circumscribed circles, which are bases of a plurality of roundness parameters s used to calculate the average value S, is 0% to 10%. By the condition where the average value S is 60% or more, and the coefficient of variation of diameter lengths of circumscribed circles, which are bases of a plurality of roundness parameters s used to calculate the average value S, is 0% to 10%, the process passability and the modeling stability are enhanced. The average value S of the roundness parameter s is more preferably 70% or more, and further preferably 80% or more. Further, the coefficient of variation of diameter lengths of circumscribed circles, which are bases of a plurality of roundness parameters s used to calculate the average value S, is more preferably 5% or less, and further preferably 3% or less.

Calculation of Average Value S of Roundness Parameter s (i) taking a photograph of a cross section perpendicular to an axial direction of the fiber-reinforced thermoplastic resin filament,
(ii) drawing an inscribed circle and a circumscribed circle of the filament in a cross-sectional image and determining each diameter length,
(iii) calculating the roundness parameter s defined by equation (1), and
(iv) repeating the procedures (i)-(iii) at a plurality of locations on the fiber-reinforced thermoplastic resin filament for a 3D printer and calculating the average value S of the roundness parameter s.

$$\text{roundness parameter } s = \text{a diameter of the inscribed circle/a diameter of the circumscribed circle} \times 100 \quad (1)$$

Evaluation Method

The fiber-reinforced thermoplastic resin filament, which was a sample, was embedded in an epoxy resin "Epoquick" (registered trademark: supplied by Buehler Corporation), cured at a room temperature for 24 hours and, m thereafter, the cross section perpendicular to the orientation direction of the reinforcing fibers in the fiber-reinforced thermoplastic resin filament was polished, and then the polished surface was photographed using a ultra-depth color 3D shape measuring microscope VHX-6000 (controller part)/VH-ZST (measuring part) (supplied by Keyence Co., Ltd.), at a magnification of 300 times. The photographing range was a range in which the entire cross section of the fiber-reinforced thermoplastic resin filament was captured. With respect to the taken photograph of the cross section of the fiber-reinforced thermoplastic resin filament, circles that inscribed and circumscribed the filament shape (including an outermost resin layer) were drawn, the respective diameter lengths were determined, and the roundness parameter s was calculated by equation (1). The polished surface was photographed over 20 or more sheets while changing the cross-sectional observation position of the fiber-reinforced thermoplastic resin filament, and the average value S of the roundness parameter s of the fiber-reinforced thermoplastic resin filament obtained from each cross section photograph may be determined, and from that value, it becomes possible to quantitatively evaluate the roundness in the fiber-reinforced thermoplastic resin filament.

Further, the coefficient of variation of a plurality of roundness parameters s used for calculating the average value S is determined by equation (4), and the coefficient of variation is preferably 10% or less. A fiber-reinforced thermoplastic resin filament, the coefficient of variation of which exceeds 10%, deteriorates in process passability, and it may cause a clogging. The coefficient of variation is more preferably 5% or less, further preferably 3% or less.

$$\text{coefficient of variation (\%)} = \text{standard deviation of roundness parameters } s/\text{average value of roundness parameters } s \times 100 \quad (4)$$

Further, the coefficient of variation of circumscribed circles, which are bases of a plurality of roundness parameters s used for calculating the average value S, is determined by equation (5), and the coefficient of variation is preferably 10% or less. A fiber-reinforced thermoplastic resin filament, the coefficient of variation of which exceeds 10%, is not stable in thickness, the discharge amount at the time of 3D printing becomes unstable, and therefore, it may cause a degradation of quality of a molded article. The coefficient of variation is more preferably 5% or less, and further preferably 3% or less.

$$\text{coefficient of variation (\%)} = \text{standard deviation of diameter lengths of circumscribed circles/average value of diameter lengths of circumscribed circles} \times 100 \quad (5)$$

Further, in the fiber-reinforced thermoplastic resin filament, it is necessary that a rate defined by the following method, in which absolute values of orientation angles of the reinforcing fibers with respect to an axial direction of the filament are 0 to 4 degrees, is 90% or more relative to the total. When the rate, in which absolute values of orientation angles of the reinforcing fibers are 0 to 4 degrees, is 90% or more relative to the total, the strength utilization rate of the reinforcing fibers becomes high, and an excellent reinforcement effect can be expected. It is more preferably 0 to 2 degrees, and further preferably 0 to 1 degree. Further, the rate is more preferably 93% or more, and further preferably 95% or more.

Evaluation Method

The fiber-reinforced thermoplastic resin filament, which was a sample, was sampled to a length of 20 mm, it was embedded in an epoxy resin "Epoquick" (registered trademark: supplied by Buehler Corporation), and cured at a room temperature for 24 hours. Thereafter, the vertical cross section, which was approximately parallel to the orientation direction of the reinforcing fibers in the fiber-reinforced thermoplastic resin filament, was polished to half the filament thickness. Then, the polished surface was photographed using a ultra-depth color 3D shape measuring microscope VHX-6000 (controller part)/VH-ZST (measuring part) (supplied by Keyence Co., Ltd.), at a magnification of 200 times, using the image connection function so that the entire vertical cross section of the 20 mm length was taken.

With respect to the taken vertical cross section photograph of the thermoplastic resin filament, the image angle was adjusted using an image processing software GIMP so that the filament axis direction was horizontal (0 degree). Then, using the image processing software Image j, binarization processing was performed with a value at which the contours of the reinforcing fibers can be clearly discriminated. On the binarized image, each of the reinforcing fibers was approximated to an ellipse using Image j, and the orientation angle (Angle) of the ellipse was determined. With respect to the result of ellipse approximation, to exclude polishing waste, noise at the time of binarization processing, and the like, a result with the major axis (Major) value smaller than 50 was deleted, and only the result of ellipse approximation of the reinforcing fibers was extracted. With respect to the extracted result, after converting the orientation angles of the reinforcing fibers to the display of −90 degrees to 90 degrees, the absolute values were determined, and a histogram was created to determine the rate of the orientation angles. The above-described value of the main axis (Major) is an example and is easily affected by the brightness and noise of the captured image, and therefore, a value that can clearly distinguish between reinforcing fibers and noise may be manually determined by comparing with the binarized image.

The length of the fiber-reinforced thermoplastic resin filament is preferably 1 m or more. When the length is 1 m or more, the thermoplastic resin can be continuously molded, and when the reinforcing fibers are continuous, a high reinforcement effect can be expected.

The thickness of the fiber-reinforced thermoplastic resin filament is preferably 0.01 to 3 mm. If the thickness is 0.01 mm or more, the strength of a molded article obtained using the fiber-reinforced thermoplastic resin filament can be improved. It is more preferably 0.1 mm or more. On the other hand, if the thickness is 3 mm or less, the flexibility of the fiber-reinforced thermoplastic resin filament can be ensured and the handleability at the time of molding is improved. It is more preferably 2 mm or less, and further preferably 1 mm or less. The thickness was measured by measuring 20 points at arbitrary positions of the fiber-reinforced thermoplastic resin filament with a caliper and determining from the average value thereof.

The flexural stiffness of the fiber-reinforced thermoplastic resin filament is preferably 1 N·m² or less. If the flexural stiffness is 1 N·m² or less, the flexibility of the filament can be ensured and the handleability at the time of molding is improved. It is more preferably 0.1 N·m² or less, further preferably 0.01 N·m² or less, and particularly preferably 0.005 N·m² or less.

Further, as the fiber volume content (Vf) of the fiber-reinforced thermoplastic resin filament, it is preferred that, when the entirety of the fiber-reinforced thermoplastic resin filament is taken as 100% by volume, the reinforcing fibers are contained by 15% by volume or more and 80% by volume or less. By containing the reinforcing fibers at 15% by volume or more, the strength of the molded article obtained using the fiber-reinforced thermoplastic resin filament can be more improved. Vf is more preferably 30% by volume or more, and further preferably 40% by volume or more. On the other hand, by containing the reinforcing fibers at 80% by volume or less, the thermoplastic resin more easily impregnated into the reinforcing fibers. The content of the reinforcing fibers in the fiber-reinforced thermoplastic resin filament is more preferably 75% by volume or less, further preferably 70% by volume or less.

Evaluation Method

The volume content Vf of the fiber-reinforced thermoplastic resin filament was determined by, after measuring the mass W0 (g) of the fiber-reinforced thermoplastic resin filament, heating the continuous fiber-reinforced thermoplastic resin filament in air at 550° C. for 3 hours to burn the thermoplastic resin component off, measuring the mass W1 (g) of the remaining reinforcing fibers, and calculating by equation (6).

$$Vf\ (\%\ by\ volume) = (W1/\rho f)/\{W1/\rho f + (W0-W1)/\rho r\} \times 100 \quad (6)$$

$\rho f$: density of reinforcing fiber (g/cm³)
$\rho r$: density of thermoplastic resin (g/cm³)

In the fiber-reinforced thermoplastic resin filament, it is preferred that the ratio of voids contained in the fiber-reinforced thermoplastic resin filament is 10% or less. When the void ratio is 10% or less, the mechanical properties of the fiber-reinforced thermoplastic resin filament can be exhibited without impairing the mechanical properties of the reinforcing fibers. It is more preferably 5% or less, and further preferably 2% or less.

Evaluation Method

The void ratio of the fiber-reinforced thermoplastic resin filament was determined by observing the cross section in the thickness direction of the fiber-reinforced thermoplastic resin filament as follows. The fiber-reinforced thermoplastic resin filament was embedded in an epoxy resin "Epoquick" (registered trademark: supplied by Buehler Corporation), cured at a room temperature for 24 hours, and thereafter, the sample was polished until the cross section in the thickness direction of the fiber-reinforced thermoplastic resin filament could be well observed. The polished sample was photographed using a ultra-depth color 3D shape measuring microscope VHX-6000 (controller part)/VH-ZST (measuring part) (supplied by Keyence Co., Ltd.), at a magnification of 300 times. The photographing range was a range in which the entire cross section of the fiber-reinforced thermoplastic resin filament was captured. In the photographed image, the total cross-sectional area of the fiber-reinforced thermoplastic resin filament and the area of the portions becoming voids were determined, and the void ratio was calculated by equation (7).

$$void\ ratio\ (\%) = 100 \times (total\ area\ of\ portions\ occupied\ by\ voids)/(total\ area\ of\ fiber\text{-}reinforced\ thermoplastic\ resin\ filament) \quad (7)$$

In the fiber-reinforced thermoplastic resin filament for a 3D printer, it is preferred that an average valued of a dispersion parameter d (%) defined by the following method is 90% or more. When the average value D is 90% or more, the variation in the mechanical properties of the fiber-reinforced thermoplastic resin filament can be reduced.

Calculation of Average Value D of Dispersion Parameter d (%)

(i) Taking a photograph of a cross section perpendicular to an axial direction of the fiber-reinforced thermoplastic resin filament for a 3D printer so that the entire cross section of the filament is taken, (ii) dividing the entire cross-sectional image into square units each having a length of one side defined by equation (2), (iii) calculating the dispersion parameter d (%) defined by equation (3), and
(iv) repeating the procedures (i)-(iii) at a plurality of locations on the fiber-reinforced thermoplastic resin filament for a 3D printer and calculating the average value D of the dispersion parameter d (%).

$$1.5a \leq t \leq 2.5a \text{ (}a\text{: fiber diameter, }t\text{: length of one side of the unit)} \quad (2)$$

dispersion parameter $d$ (%)=number of units each containing a reinforcing fiber in an evaluation zone/total number of units each containing any part of the filament in an evaluation zone×100 (3)

Evaluation Method

The fiber-reinforced thermoplastic resin filament, which was a sample, was embedded in an epoxy resin "Epoquick" (registered trademark: supplied by Buehler Corporation), cured at a room temperature for 24 hours and, thereafter, the cross section perpendicular to the orientation direction of the reinforcing fibers in the fiber-reinforced thermoplastic resin filament was polished, and then the polished surface was photographed using a ultra-depth color 3D shape measuring microscope VHX-6000 (controller part)/VH-ZST (measuring part) (supplied by Keyence Co., Ltd.), at a magnification of 300 times. The photographing range was a range in which the entire cross section of the fiber-reinforced thermoplastic resin filament was captured. Image analysis was performed on the taken photograph of the cross section of the fiber-reinforced thermoplastic resin filament, using Image j, and the photograph was divided into approximately square units having a length of one side defined by equation (2) and not overlapping each other. Image analysis was performed on these approximately square units in order, units containing reinforcing fibers in the approximately square units were counted, and the dispersion parameter d was calculated by equation (3). The above-described image processing is determined by calculating the number of units each containing reinforcing fibers in the unit relative to the number of units each containing even a part of the filament in the divided approximately square unit. In principle, discriminant analysis is used for the binarization, but depending upon examples, it is possible to perform it manually while comparing with the photograph taken. Further, to count the units containing the reinforcing fibers, if even a part of the reinforcing fiber is contained, it is counted, and even if two or more reinforcing fibers are contained, it is counted as one as the number of units. The polished surface is photographed over 20 or more sheets while changing the cross-sectional observation position of the fiber-reinforced resin filament, and relatively to the dispersion parameters d of the fiber-reinforced thermoplastic resin filament obtained from each cross-sectional photograph, its average value D may be determined, and from that value, the distribution state of reinforcing fibers in the fiber-reinforced thermoplastic resin filament can be quantitatively evaluated.

The size of the unit determined by equation (2) is defined by the relationship with the diameter of the observed reinforcing fibers. If the size of the unit is smaller than the range of equation (2), the dispersion parameter is converged on the volume content and the dispersibility cannot be accurately expressed. On the other hand, if it is larger than the range of equation (2), the value becomes constant regardless of whether the dispersibility is good or not, and it is not accurate. Therefore, the size of the unit is preferably in the range of equation (2).

Furthermore, the coefficient of variation of a plurality of dispersion parameters d used to calculate the average value D can be determined from equation (8). If the coefficient of variation exceeds 4%, the variation of the density of reinforcing fibers increases depending upon the locations in the fiber-reinforced thermoplastic resin filament. Therefore, the coefficient of variation is preferably 4% or less, and more preferably 3% or less.

coefficient of variation (%)=standard deviation of dispersion parameters $d$/average value of dispersion parameters $d$×100 (8)

As aforementioned, in the fiber-reinforced thermoplastic resin filament, the rate defined by the aforementioned method, in which absolute values of orientation angles of the reinforcing fibers with respect to the axial direction of the filament are 0 to 4 degrees, is 90% or more relative to the total, and when the rate, in which absolute values of orientation angles of the reinforcing fibers are 0 to 4 degrees, is 90% or more relative to the total, the strength utilization rate of the reinforcing fibers becomes high, and an excellent reinforcement effect can be expected. It is more preferably 0 to 2 degrees, and further preferably 0 to 1 degree. Further, the rate is more preferably 93% or more, and further preferably 95% or more.

A molded article can be obtained by laminating one or more fiber-reinforced thermoplastic resin filaments in an arbitrary configuration and then molding while applying heat and/or pressure as needed.

As a method of applying heat and/or pressure, for example, exemplified are a press molding method of placing molding materials stacked at an arbitrary configuration in a mold or on a press plate and then pressing them by closing the mold or the press plate, an autoclave molding method of putting molding materials stacked at an arbitrary configuration into an autoclave and pressurizing and heating them, a bagging molding method of wrapping molding materials stacked at an arbitrary configuration with a film or the like and while depressurizing the inside of them and pressurizing them at an atmospheric pressure, heating them in an oven, a wrapping tape method of winding a tape while applying a tension to continuous fiber-reinforced thermoplastic resin materials stacked at an arbitrary configuration, and heating them in an oven, an internal pressure molding method of placing continuous fiber-reinforced thermoplastic resin materials stacked at an arbitrary configuration in a mold and pressurizing them by injecting a gas, a liquid or the like into a core set in the mold in a similar manner, a 3D printing method of heating and pressurizing molding materials and while melt-laminating them, molding a three-dimensional shape or the like. In particular, a 3D printing method suitable for molding of a complicated shape is preferably used.

The fiber-reinforced thermoplastic resin filament and its molded article can be utilized by its excellent properties for various applications such as aircraft parts, automobile parts, electric/electronic parts, building materials, various containers, daily necessities, household goods and sanitary goods. The fiber-reinforced thermoplastic resin filament and its molded article are particularly preferably used for aircraft engine peripheral parts requiring stable mechanical properties, exterior parts for aircraft parts, vehicle skeleton as an automobile body part, automobile engine peripheral parts, automobile under-hood parts, automobile gear parts, automobile interior parts, automobile exterior parts, intake and exhaust parts, engine cooling water-system parts, automobile electric parts and electric/electronic parts applications. Concretely, the fiber-reinforced thermoplastic resin filament and its molded article are preferably used for aircraft engine peripheral parts such as fan blades, aircraft related parts such as landing gear pods, winglets, spoiler, edges, ladders, elevators, failings and ribs, automobile body parts such as various seats, front bodies, underbodies, various pillars, various members, various frames, various beams, various supports, various rails and various hinges, automobile engine peripheral parts such as engine covers, air intake pipes, timing belt covers, intake manifolds, filler caps, throttle bodies and cooling fans, automobile under-hood parts such as cooling fans, tops and bases of radiator tanks, cylinder head covers, oil pans, brake piping, tubes for fuel piping and exhaust gas system parts, automobile gear parts such as gears, actuators, bearing retainers, bearing cages, chain guides and chain tensioners, automobile interior parts such as shift lever brackets, steering lock brackets, key cylinders, door inner handles, door handle cowls, indoor mirror brackets, air conditioner switches, instrumental panels, console boxes, glove boxes, steering wheels, and trims, automobile exterior parts such as front fenders, rear fenders, fuel lids, door panels, cylinder head covers, door mirror stays, tailgate panels, licensed garnishes, roof rails, engine mount brackets, rear garnishes, rear spoilers, trunk lids, locker malls, malls, lamp housings, front grills, mud guards and side bumper, intake and exhaust parts such as air intake manifolds, intercooler inlets, turbochargers, exhaust pipe covers, inner bushes, bearing retainers, engine mounts, engine head covers, resonators and throttle bodies, engine cooling water-system parts such as chain covers, thermostat housings, outlet pipes, radiator tanks, alternators and delivery pipes, automobile electric parts such as connectors, wire harness connectors, motor parts, lamp sockets, sensor vehicle switches and combination switches, as electric/electronic parts, for example, electric parts such as electric generators, electric motors, transformers, current transformers, voltage regulators, rectifiers, resistors, inverters, relays, power contacts, open/close controllers, circuit breakers, switches, knife switches, multipole rods, motor cases, television housings, notebook computer housings and internal parts thereof, CRT display housings and internal parts thereof, printer housings and internal parts thereof, mobile phones, mobile personal computers, mobile terminal housings such as ones for handheld type mobiles and internal parts thereof, IC and LED-compatible housings, capacitor seats, fuse holders, various gears, various cases and cabinets, electronic parts such as connectors, SMT-compatible connectors, card connectors, jacks, coils, coil bobbins, sensors, LED lamps, sockets, resistors, relays, relay cases, reflectors, small switches, power supply parts, capacitors, variable capacitor cases, optical pickup chassis, oscillators, various terminal boards, transformers, plugs, printed circuit boards, tuners, speakers, microphones, headphones, small motors, magnetic head bases, power modules, Si power modules and SiC power modules, semiconductors, liquid crystals, FDD carriages, FDD chassis, motor brush holders, transformer members, parabolic antennas, computer related parts and the like.

EXAMPLES

Hereinafter, our filaments and molded articles will be explained more specifically with reference to Examples, but this disclosure is not limited to the description of these Examples. The evaluations of properties in each Example and Comparative Example were carried out according to the following methods.

1. Roundness
(i) Taking a photograph of a cross section perpendicular to an axial direction of the fiber-reinforced thermoplastic resin filament,
(ii) drawing an inscribed circle and a circumscribed circle of the filament in a cross-sectional image and determining each diameter length,
(iii) calculating the roundness parameter s defined by the following equation (1), and
(iv) repeating the procedures (i)-(iii) at a plurality of locations on the fiber-reinforced thermoplastic resin filament and calculating the average value S of the roundness parameter s.

$$\text{roundness parameter } s = \text{a diameter of the inscribed circle/a diameter of the circumscribed circle} \times 100 \quad (1)$$

Evaluation Method

The fiber-reinforced thermoplastic resin filament, which was a sample, was embedded in an epoxy resin "Epoquick" (registered trademark: supplied by Buehler Corporation), cured at a room temperature for 24 hours, and thereafter, the cross section perpendicular to the orientation direction of the reinforcing fibers in the fiber-reinforced thermoplastic resin filament was polished, and then the polished surface was photographed using a ultra-depth color 3D shape measuring microscope VHX-6000 (controller part)/VH-ZST (measuring part) (supplied by Keyence Co., Ltd.), at a magnification of 300 times. The photographing range was a range in which the entire cross section of the fiber-reinforced thermoplastic resin filament was captured.

With respect to the taken photograph of the cross section of the fiber-reinforced thermoplastic resin filament, circles that inscribed and circumscribed the filament outer shape were drawn, the respective diameter lengths were determined, and the roundness parameter s was calculated by equation (1). The polished surface was photographed over 20 or more sheets while changing the cross-sectional observation position of the fiber-reinforced thermoplastic resin filament, and the average value S, and the coefficient of variation of a plurality of roundness parameters s used for calculating the average value S, were calculated.

2. Fiber Volume Content (Vf)

The fiber volume content Vf of the fiber-reinforced thermoplastic resin filament obtained in each Example and Comparative Example was determined by, after measuring the mass W0 (g) of the fiber-reinforced thermoplastic resin filament, heating the fiber-reinforced thermoplastic resin filament in air at 550° C. for 3 hours to burn the thermoplastic resin component off, measuring the mass W1 (g) of the remaining reinforcing fibers, and calculating by equation (6).

$$Vf (\% \text{ by volume}) = (W1/\rho f)/\{W1/\rho f + (W0-W1)/\rho r\} \times 100 \quad (6)$$

ρf: density of reinforcing fiber (g/cm$^3$)
ρr: density of thermoplastic resin (g/cm$^3$)

3. Thickness

The thickness of the fiber-reinforced thermoplastic resin filament obtained in each Example and Comparative Example was measured by measuring 20 points at arbitrary positions of the fiber-reinforced thermoplastic resin filament with a caliper and determining from the average value thereof.

4. Impregnation Property

The cross section in the thickness direction of the fiber-reinforced thermoplastic resin filament obtained in each Example and Comparative Example was observed as follows. The fiber-reinforced thermoplastic resin filament was embedded in an epoxy resin "Epoquick" (registered trademark: supplied by Buehler Corporation), cured at a room temperature for 24 hours and, thereafter, the sample was polished until the cross section in the thickness direction of the fiber-reinforced thermoplastic resin filament could be well observed. The polished sample was photographed using a ultra-depth color 3D shape measuring microscope VHX-6000 (controller part)/VH-ZST (measuring part) (supplied by Keyence Co., Ltd.), at a magnification of 300 times. The photographing range was a range in which the entire cross section of the fiber-reinforced thermoplastic resin filament was captured. In the photographed image, the total cross-sectional area of the fiber-reinforced thermoplastic resin filament and the area of the portions becoming voids were determined, and the void ratio was calculated by equation (7) (the impregnation rate is a reciprocal of the void ratio).

$$\text{void ratio (\%)} = 100 \times \text{(total area of portions occupied by voids)/(total area of fiber-reinforced thermoplastic resin filament)} \quad (7)$$

5. Uniformity (i) Taking a photograph of a cross section perpendicular to an axial direction of the fiber-reinforced thermoplastic resin filament so that the entire cross section of the filament is taken,
(ii) dividing the entire cross-sectional image into square units each having a length of one side defined by equation (2),
(iii) calculating the dispersion parameter d defined by equation (3), and
(iv) repeating the procedures (i)-(iii) at a plurality of locations on the fiber-reinforced thermoplastic resin filament for a 3D printer and calculating the average value D of the dispersion parameter d.

$$1.5a \leq t \leq 2.5a \ (a\text{: fiber diameter, } t\text{: length of one side of the unit}) \quad (2)$$

$$\text{dispersion parameter } d \ (\%) = \text{number of units each containing } a \text{ reinforcing fiber in an evaluation zone/total number of units each containing any part of the filament in an evaluation zone} \times 100 \quad (3)$$

Evaluation Method

The fiber-reinforced thermoplastic resin filament, which was a sample, was embedded in an epoxy resin "Epoquick" (registered trademark: supplied by Buehler Corporation), cured at a room temperature for 24 hours and, thereafter, the cross section perpendicular to the orientation direction of the reinforcing fibers in the fiber-reinforced thermoplastic resin filament was polished, and then the polished surface was photographed using a ultra-depth color 3D shape measuring microscope VHX-6000 (controller part)/VH-ZST (measuring part) (supplied by Keyence Co., Ltd.), at a magnification of 300 times. The photographing range was a range in which the entire cross section of the fiber-reinforced thermoplastic resin filament was captured. Image analysis was performed on the taken photograph of the cross section of the fiber-reinforced thermoplastic resin filament, using Image j, and the photograph was divided into approximately square units having a length of one side defined by equation (2) and not overlapping each other. Image analysis was performed on these approximately square units in order, units containing reinforcing fibers in the approximately square units were counted, and the dispersion parameter d was calculated by equation (3).

With respect to the dispersion parameter d thus obtained, the polished surface was photographed over 20 or more sheets while changing the cross-sectional observation position of the fiber-reinforced resin filament, and the average value D thereof, and the coefficient of variation of a plurality of dispersion parameters d used for calculating the average value D, were calculated.

6. Straightness

The fiber-reinforced thermoplastic resin filament obtained in each Example and Comparative Example was sampled to a length of 20 mm, it was embedded in an epoxy resin "Epoquick" (registered trademark: supplied by Buehler Corporation), and cured at a room temperature for 24 hours. Thereafter, the vertical cross section, which was approximately parallel to the orientation direction of the reinforcing fibers in the fiber-reinforced thermoplastic resin filament, was polished to half the filament thickness. Then, the polished surface was photographed using a ultra-depth color 3D shape measuring microscope VHX-6000 (controller part)/VH-ZST (measuring part) (supplied by Keyence Co., Ltd.), at a magnification of 200 times, using the image connection function so that the entire vertical cross section of the 20 mm length was taken.

With respect to the taken vertical cross section photograph of the thermoplastic resin filament, the image angle was adjusted using an image processing software GIMP so that the filament axis direction was horizontal (0 degree). Then, using the image processing software Image j, binarization processing was performed with a value at which the contours of the reinforcing fibers can be clearly discriminated. On the binarized image, each of the reinforcing fibers was approximated to an ellipse using Image j, and the orientation angle (Angle) of the ellipse was determined. With respect to the result of ellipse approximation, to exclude polishing waste, noise at the time of binarization processing and the like, a result with the major axis (Major) value smaller than 50 was deleted, and only the result of ellipse approximation of the reinforcing fibers was extracted. With respect to the extracted result, after converting the orientation angles of the reinforcing fibers to the display of −90 degrees to 90 degrees, the absolute values were determined, and a histogram was created to determine the rate of the orientation angles.

7. Flexural Stiffness

The flexural stiffness of the fiber-reinforced thermoplastic resin filament obtained in each Example and Comparative Example was calculated by equation (10).

$$\text{Flexural stiffness} = E \times I \quad (10)$$

wherein
E: flexural modulus of fiber-reinforced thermoplastic resin filament
I: moment of inertia of area The flexural modulus of the fiber-reinforced thermoplastic resin filament was determined in accordance with JIS K7074 (2012). The measurement was performed by a bending test along the axial direction of the filament.

8. Handleability

The handleability of the fiber-reinforced thermoplastic resin filament obtained in each Example and Comparative Example was determined by winding the fiber-reinforced thermoplastic resin filament on a roll having an inner diameter of 150 mm and determining the breakage or slack of the wound fiber-reinforced thermoplastic resin filament. It was evaluated by the following two ranks, and a was determined to be acceptable.
　○: No breakage, no slack
　×: breakage, slack present 9. Modeling Property by 3D Printer With respect to the fiber-reinforced thermoplastic resin filament obtained in each Example and Comparative Example, using a commercial 3D printer of FDM system (UltimakerS5, supplied by Ultimaker Co., Ltd.), the adhesion between filaments, when modeled at a temperature of the melting point of the thermoplastic resin used to the filament+30° C., was confirmed by visual observation, and evaluated by the following two ranks, and ○ was determined to be acceptable. As to the nozzle of the 3D printer, a commercially available nozzle was additionally machined so that the diameter of the tip discharge port became the thickness of the fiber-reinforced thermoplastic resin filament obtained in each Example and Comparative Example+0.1 mm.

- ○ (good): state where the adhesion between filaments after modeling is high, and the gap between filaments is almost invisible.
- x (defective): state where the adhesion between filaments after modeling is poor, and the gap between filaments can be clearly observed.

10. Process Passability Due to 3D Printer

With respect to the fiber-reinforced thermoplastic resin filament obtained in each Example and Comparative Example, using a commercial 3D printer of FDM system (UltimakerS5, supplied by Ultimaker Co., Ltd.), it was confirmed whether clogging occurred when the filament was subjected to modeling by a length of 2 m at a temperature of the melting point of the thermoplastic resin used to the filament+30° C. The above-described test was repeated 20 times and evaluated by the following two ranks, and ○ was determined to be acceptable. As to the nozzle of the 3D printer, a commercially available nozzle was additionally machined so that the diameter of the tip discharge port became the thickness of the fiber-reinforced thermoplastic resin filament obtained in each Example and Comparative Example+0.1 mm.

- ○ (good): the number of times of clogging occurrence: 0 to 2 times
- x (defective): the number of times of clogging occurrence: 3 times or more Raw Material In Examples and Comparative Examples, the raw materials shown below were used.

Carbon fiber bundle

PAN-based carbon fiber (CF) "TORAYCA (registered trademark)" supplied by Toray Industries, Inc.

(Thermoplastic Resin)

polyphenylene sulfide (PPS) resin "TORELINA (registered trademark)" supplied by Toray Industries, Inc.

polyether ether ketone (PEEK) resin "VICTREX (registered trademark)" supplied by Victrex Japan Co., Ltd.

polyether ketone ketone (PEKK) resin "KEPSTAN (registered trademark)" supplied by Arkema Co., Ltd.

polyether imide (PEI) resin "ULTEM (registered trademark)" supplied by SABIC Co., Ltd.

Example 1

One bobbin wound with the carbon fiber bundle was prepared, and the carbon fiber bundle was sent out continuously from the bobbin through a yarn path guide. The PPS resin quantitatively supplied from a filled feeder was impregnated into the carbon fiber bundle continuously sent out, in an impregnation die. The carbon fiber bundle, impregnated with the resin in the impregnation die, was continuously drawn from a nozzle of the impregnation die at a drawing speed of 1 m/min using a drawing roll. The drawn carbon fiber bundle passed through a cooling die, the PPS resin cooled and solidified, and the bundle wound on a winding machine as a continuous fiber-reinforced thermoplastic resin filament for a 3D printer. The obtained fiber-reinforced thermoplastic resin filament for a 3D printer had a cross-sectional shape of a circle, and the reinforcing fibers were arranged in one direction. The properties and evaluation results of the obtained fiber-reinforced thermoplastic resin filament are shown in Table 1, and they were excellent in handleability, modeling property, process passability, and straightness of reinforcing fibers.

Examples 2 and 3

Fiber-reinforced thermoplastic resin filaments were prepared in a manner similar to that in Example 1 other than conditions where the fiber volume contents and the thicknesses of the filaments were changed. The properties and evaluation results of the obtained fiber-reinforced thermoplastic resin filaments are shown in Table 1, and they were excellent in handleability, modeling property, process passability, and straightness of reinforcing fibers.

Example 4

A fiber-reinforced thermoplastic resin filament was prepared in a manner similar to that in Example 1 other than a condition where the thermoplastic resin was changed to the PEI resin. The properties and evaluation results of the obtained fiber-reinforced thermoplastic resin filament are shown in Table 1, and they were excellent in handleability, modeling property, process passability, and straightness of reinforcing fibers.

Comparative Example 1

One bobbin wound with the carbon fiber bundle was prepared, and the carbon fiber bundle sent out continuously from the bobbin through a yarn path guide. The PPS resin quantitatively supplied from a filled feeder was impregnated into the carbon fiber bundle continuously sent out, in an impregnation die. The carbon fiber bundle, impregnated with the resin in the impregnation die, was continuously drawn from a nozzle of the impregnation die at a drawing speed of 5 m/min using a drawing roll. The drawn carbon fiber bundle passed through a cooling die, the PPS resin was cooled and solidified, and the bundle wound on a winding machine as a continuous fiber-reinforced thermoplastic resin filament for a 3D printer. The obtained fiber-reinforced thermoplastic resin filament for a 3D printer had a cross-sectional shape of an ellipse, and the reinforcing fibers were arranged in one direction. The results are shown in Table 1 and, although the handleability was excellent, the modeling property, the process passability, the void ratio, the uniformity of reinforcing fibers and the straightness of reinforcing fibers are poor.

Example 5

One bobbin wound with the carbon fiber bundle was prepared, and the carbon fiber bundle sent out continuously from the bobbin through a yarn path guide. The PPS resin quantitatively supplied from a filled feeder was impregnated into the carbon fiber bundle continuously sent out, in an impregnation die. The carbon fiber bundle, impregnated with the resin in the impregnation die, was continuously drawn from a nozzle of the impregnation die (die having a sheath-core structure, and only the resin was extruded at the sheath part) at a drawing speed of 1 m/min using a drawing roll. The drawn carbon fiber bundle passed through a cooling die, the resin was cooled and solidified, and the bundle was wound on a winding machine as a continuous fiber-reinforced thermoplastic resin filament. The obtained fiber-reinforced thermoplastic resin filament had a cross-sectional shape of a circle, and the reinforcing fibers were arranged in one direction. The properties and evaluation results of the obtained fiber-reinforced thermoplastic resin filament are shown in Table 2.

Examples 6 and 7

Fiber-reinforced thermoplastic resin filaments were prepared in a manner similar to that in Example 1 other than conditions where the fiber volume contents and the thicknesses of the filaments were changed. The properties and evaluation results of the obtained fiber-reinforced thermoplastic resin filaments are shown in Table 2, and they were excellent in handleability and modeling property.

Example 8

A fiber-reinforced thermoplastic resin filament was prepared in a manner similar to that in Example 1 other than a condition where the PEKK resin was impregnated. The properties and evaluation results of the obtained fiber-reinforced thermoplastic resin filament are shown in Table 2, and it was excellent in handleability and modeling property.

Comparative Example 2

One bobbin wound with the carbon fiber bundle was prepared, and the carbon fiber bundle sent out continuously from the bobbin through a yarn path guide. The PPS resin quantitatively supplied from a filled feeder was impregnated into the carbon fiber bundle continuously sent out, in an impregnation die. The carbon fiber bundle, impregnated with the resin in the impregnation die, was continuously drawn from a nozzle of the impregnation die (die not having a sheath-core structure) at a drawing speed of 4 m/min using a drawing roll. The drawn carbon fiber bundle passed through a cooling die, the PPS resin was cooled and solidified, and the bundle wound on a winding machine as a continuous fiber-reinforced thermoplastic resin filament. The obtained fiber-reinforced thermoplastic resin filament had a cross-sectional shape of a circle, and the reinforcing fibers were arranged in one direction. The properties and evaluation results of the obtained fiber-reinforced thermoplastic resin filament are shown in Table 2, and although the handleability was excellent, the modeling property and the process passability are poor.

Comparative Example 3

One bobbin wound with the carbon fiber bundle was prepared, and the carbon fiber bundle sent out continuously from the bobbin through a yarn path guide. The PPS resin quantitatively supplied from a filled feeder was impregnated into the carbon fiber bundle continuously sent out, in an impregnation die. The carbon fiber bundle, impregnated with the resin in the impregnation die, was continuously drawn from a nozzle of the impregnation die (die not having a sheath-core structure) at a drawing speed of 6 m/min using a drawing roll. The drawn carbon fiber bundle passed through a cooling die, the PPS resin was cooled and solidified, and the bundle was wound on a winding machine as a continuous fiber-reinforced thermoplastic resin filament. The obtained fiber-reinforced thermoplastic resin filament had a cross-sectional shape of a circle, and the reinforcing fibers were arranged in one direction. The properties and evaluation results of the obtained fiber-reinforced thermoplastic resin filament are shown in Table 2, and the handleability, the modeling property and the process passability are poor.

Example 9

The PPS resin and the PEI resin were mixed by a twin-screw kneader so that the weight ratio was 90:10 to prepare PPS/PEI polymer alloy pellets. One bobbin wound with the carbon fiber bundle was prepared, and the carbon fiber bundle sent out continuously from the bobbin through a yarn path guide. The above-described PPS/PEI resin quantitatively supplied from a filled feeder was impregnated into the carbon fiber bundle continuously sent out, in an impregnation die. The carbon fiber bundle, impregnated with the resin in the impregnation die, was continuously drawn from a nozzle of the impregnation die at a drawing speed of 1 m/min using a drawing roll. The drawn carbon fiber bundle passed through a cooling die, the PPS/PEI resin was cooled and solidified, and the bundle was wound on a winding machine as a continuous fiber-reinforced thermoplastic resin filament. The obtained fiber-reinforced thermoplastic resin filament had a cross-sectional shape of a circle, and the reinforcing fibers were arranged in one direction. The properties and evaluation results of the obtained fiber-reinforced thermoplastic resin filament are shown in Table 3, and the handleability, the modeling property and the process passability are excellent.

Examples 10 and 11

Fiber-reinforced thermoplastic resin filaments were prepared in a manner similar to that in Example 1 other than conditions where the fiber volume contents and the thicknesses of the filaments were changed. The properties and evaluation results of the obtained fiber-reinforced thermoplastic resin filaments are shown in Table 3, and they were excellent in handleability, modeling property and process passability.

Example 12

The PEEK resin and the PEI resin were mixed by a twin-screw kneader so that the weight ratio was 90:10 to prepare PEEK/PEI polymer alloy pellets. A fiber-reinforced thermoplastic resin filament was prepared in a manner similar to that in Example 1 other than a condition where the PEEK/PEI resin was impregnated. The properties and evaluation results of the obtained fiber-reinforced thermoplastic resin filament are shown in Table 3, and it was excellent in handleability, modeling property and process passability.

Comparative Example 4

One bobbin wound with the carbon fiber bundle was prepared, and the carbon fiber bundle sent out continuously from the bobbin through a yarn path guide. The PPS/PEI resin quantitatively supplied from a filled feeder was impregnated into the carbon fiber bundle continuously sent out, in an impregnation die. The carbon fiber bundle, impregnated with the resin in the impregnation die, was continuously drawn from a nozzle of the impregnation die at a drawing speed of 1 m/min using a drawing roll. The drawn carbon fiber bundle passed through a cooling die, the PPS/PEI resin was cooled and solidified, and the bundle wound on a winding machine as a continuous fiber-reinforced thermoplastic resin filament. The obtained fiber-reinforced thermoplastic resin filament had a cross-sectional shape of a circle, and the reinforcing fibers were arranged in one direction. The properties and evaluation results of the obtained fiber-reinforced thermoplastic resin filament are shown in Table 3, and although the handleability and the modeling property were excellent, and the process passability is poor because the thickness of the filament is large.

TABLE 1

| | | | Example 1 | Example 2 | Example 3 | Example 4 | Comparative Example 1 |
|---|---|---|---|---|---|---|---|
| Raw material Filament | Reinforcing fiber | — | CF | CF | CF | CF | CF |
| | Resin | — | PPS | PPS | PPS | PEI | PPS |
| | Fiber volume content | % | 45 | 35 | 65 | 45 | 45 |
| | Length | m | >10 | >10 | >10 | >10 | >10 |
| | Thickness | mm | 0.6 | 0.7 | 0.5 | 0.6 | 0.6 |
| | Cross-sectional shape | — | circle | circle | circle | circle | ellipse |
| | Void ratio | % | 1.1 | 1.3 | 1.2 | 1.2 | 7 |
| | Average diameter of circumscribed circle | mm | 0.65 | 0.76 | 0.54 | 0.66 | 0.42 |
| | Coefficient of variation of circumscribed circle | % | 2.9 | 2.4 | 4.1 | 3.5 | 11 |
| | Average diameter of inscribed circle | mm | 0.56 | 0.65 | 0.47 | 0.55 | 0.77 |
| | Average value S of roundness parameter | % | 87.5 | 86.7 | 88.7 | 84.6 | 55.8 |
| | Coefficient of variation of roundness parameter s | % | 1.7 | 1.6 | 1.9 | 1.8 | 6.8 |
| | Straightness | % | 99 | 97 | 98 | 96 | 87 |
| | Rate of reinforcing fiber orientation angle of 0 to 4 degrees | | | | | | |
| | Average value D of dispersion parameter | % | 98 | 93 | 98 | 96 | 93 |
| | Coefficient of variation of dispersion parameter d | % | 1.8 | 1.9 | 0.6 | 2.0 | 2.9 |
| Evaluation | Flexural stiffness | $N \cdot m^2$ | 0.0009 | 0.0010 | 0.0005 | 0.0010 | 0.0007 |
| | Handleability | — | ○ | ○ | ○ | ○ | ○ |
| | Modeling property | — | ○ | ○ | ○ | ○ | x |
| | Process passability | — | ○ | ○ | ○ | ○ | x |

TABLE 2

| | | | Example 5 | Example 6 | Example 7 | Example 8 | Comparative Example 2 | Comparative Example 3 |
|---|---|---|---|---|---|---|---|---|
| Raw material Filament | Reinforcing fiber | — | CF | CF | CF | CF | CF | CF |
| | Resin | — | PPS | PPS | PPS | PEKK | PPS | PPS |
| | Fiber volume content | % | 48 | 37 | 56 | 47 | 40 | 50 |
| | Volume ratio of thermoplastic resin layer | % | 2 | 3 | 4 | 3 | — | — |
| | Length | m | >10 | >10 | >10 | >10 | >10 | >10 |
| | Thickness | mm | 0.61 | 0.72 | 0.53 | 0.61 | 0.7 | 4 |
| | Cross-sectional shape | — | circle | circle | circle | circle | ellipse | ellipse |
| | Void ratio | % | 0.5 | 0.3 | 0.6 | 0.6 | 0.4 | 0.9 |
| | Average diameter of circumscribed circle | mm | 0.66 | 0.74 | 0.55 | 0.67 | 0.75 | 4.2 |
| | Coefficient of variation of circumscribed circle | % | 3.0 | 2.5 | 4.1 | 3.4 | 12.0 | 11.0 |
| | Average diameter of inscribed circle | mm | 0.56 | 0.66 | 0.48 | 0.54 | 0.63 | 3.5 |
| | Average value S of roundness parameter | % | 85 | 86 | 83 | 81 | 53 | 56 |
| | Coefficient of variation of roundness parameter s | % | 1.7 | 1.6 | 1.9 | 1.8 | 6.8 | 7.2 |
| | Straightness Rate of reinforcing fiber orientation angle of 0 to 4 degrees | % | 99 | 97 | 98 | 96 | 87 | 85 |
| | Average value D of dispersion parameter | % | 96 | 92 | 98 | 97 | 94 | 93 |
| | Coefficient of variation of dispersion parameter d | % | 2.1 | 1.9 | 0.7 | 1.9 | 2.0 | 2.9 |
| Evaluation | Flexural stiffness | $N \cdot m^2$ | 0.0008 | 0.001 | 0.0005 | 0.0008 | 0.0010 | 2 |
| | Handleability | — | ○ | ○ | ○ | ○ | ○ | x |
| | Modeling property | — | ○ | ○ | ○ | ○ | x | x |
| | Process passability | — | ○ | ○ | ○ | ○ | x | x |

TABLE 3

|  |  |  | Example 9 | Example 10 | Example 11 | Example 12 | Comparative Example 4 |
|---|---|---|---|---|---|---|---|
| Raw material Filament | Reinforcing fiber | — | CF | CF | CF | CF | CF |
|  | Resin | — | PPS/PEI | PPS/PEI | PPS/PEI | PEEK/PEI | PPS/PEI |
|  | Fiber volume content | % | 50 | 40 | 60 | 50 | 50 |
|  | Length | m | >10 | >10 | >10 | >10 | >10 |
|  | Thickness | mm | 0.6 | 0.7 | 0.5 | 0.6 | 4 |
|  | Cross-sectional shape | — | circle | circle | circle | circle | circle |
|  | Void ratio | % | 0.5 | 0.4 | 0.6 | 0.7 | 0.7 |
|  | Average diameter of circumscribed circle | mm | 0.65 | 0.73 | 0.53 | 0.67 | 4.2 |
|  | Coefficient of variation of circumscribed circle | % | 2.8 | 2.5 | 4.1 | 3.5 | 11 |
|  | Average diameter of inscribed circle | mm | 0.55 | 0.64 | 0.42 | 0.55 | 3.4 |
|  | Average value S of roundness parameter | % | 83 | 87 | 80 | 82 | 55 |
|  | Coefficient of variation of roundness parameter s | % | 1.8 | 1.5 | 2.0 | 1.9 | 7.0 |
|  | Straightness | % | 99 | 97 | 98 | 96 | 85 |
|  | Rate of reinforcing fiber orientation angle of 0 to 4 degrees |  |  |  |  |  |  |
|  | Average value D of dispersion parameter | % | 98 | 93 | 98 | 96 | 93 |
|  | Coefficient of variation of dispersion parameter d | % | 1.8 | 1.9 | 0.6 | 2.0 | 2.9 |
| Evaluation | Flexural stiffness | N·m² | 0.0009 | 0.001 | 0.0005 | 0.0010 | 2 |
|  | Handleability | — | ○ | ○ | ○ | ○ | ○ |
|  | Modeling property | — | ○ | ○ | ○ | ○ | ○ |
|  | Process passability | — | ○ | ○ | ○ | ○ | x |

INDUSTRIAL APPLICABILITY

The fiber-reinforced thermoplastic resin filament can be molded into a desired shape by an arbitrary method such as a press molding method or a 3D printing method, and in particular, the 3D printing method requires to achieve both high reinforcement effect and handleability at the time of molding, and it is suitable as a method of molding the fiber-reinforced thermoplastic resin filament. The molded article obtained by molding the fiber-reinforced thermoplastic resin filament is effective for applications such as aircraft engine peripheral parts, interior parts for aircraft, exterior parts for aircraft, vehicle skeletons, automobile engine peripheral parts, automobile under-hood parts, automobile gear parts, automobile interior parts, automobile exterior parts, intake and exhaust parts, engine cooling water-system parts, automobile applications such as automobile electric parts, and applications of electric/electronic parts such as LED reflectors and SMT connectors.

The invention claimed is:

1. A fiber-reinforced thermoplastic resin filament for a 3D printer, the fiber-reinforced thermoplastic resin filament comprising:
    a thermoplastic resin impregnated into a plurality of continuous reinforcing fibers, wherein an average value S of a roundness parameter s of a cross section evaluated by a method is 60% to 100%, and a coefficient of variation of diameter lengths of circumscribed circles, which are bases of a plurality of roundness parameters s used to calculate the average value S, is 0% to 10%, wherein the roundness parameter s is determined by:
    (i) taking a photograph of a cross section perpendicular to an axial direction of the fiber-reinforced thermoplastic resin filament for a 3D printer,
    (ii) drawing an inscribed circle and a circumscribed circle of the filament in a cross-sectional image and determining a diameter of the inscribed circle and a diameter of the circumscribed circle,
    (iii) calculating the roundness parameter s defined by equation (1), and
    (iv) repeating (i)-(iii) at a plurality of locations on the fiber-reinforced thermoplastic resin filament for a 3D printer and calculating the average value S of the roundness parameter s roundness parameter s=the diameter of the inscribed circle/the diameter of the circumscribed circle× 100    (1);

and
    wherein the fiber-reinforced thermoplastic resin filament has a flexural stiffness of 1 N·m2 or less.

2. The fiber-reinforced thermoplastic resin filament for a 3D printer according to claim 1, wherein a rate, in which absolute values of orientation angles of the reinforcing fibers with respect to an axial direction of the filament are 0 to 4 degrees, is 90% or more relative to a total.

3. The fiber-reinforced thermoplastic resin filament according to claim 1, wherein a coefficient of variation of the plurality of roundness parameters s used to calculate the average value S is 10% or less.

4. The fiber-reinforced thermoplastic resin filament according to claim 1, wherein (a) to (c) are satisfied:
    (a) a volume ratio of the reinforcing fibers in the fiber-reinforced thermoplastic resin filament for a 3D printer is 15 to 80%, and a volume ratio of the thermoplastic resin is 85 to 20%,
    (b) a thickness of the fiber-reinforced thermoplastic resin filament is 0.01 to 3 mm, and
    (c) a filament length of the fiber-reinforced thermoplastic resin filament is 1 m or more.

5. The fiber-reinforced thermoplastic resin filament according to claim 1, having a porosity of 10% or less.

6. The fiber-reinforced thermoplastic resin filament according to claim 1, wherein the reinforcing fibers are at least one selected from the group consisting of carbon fibers, glass fibers and aramid fibers.

7. The fiber-reinforced thermoplastic resin filament according to claim 1, wherein the thermoplastic resin is at least one selected from the group consisting of polyphenylene sulfide (PPS) resin, polyetherimide (PEI) resin, polyphenylene ether ether ketone (PEEK) resin, polyphenylene ether ketone (PEK) resin and polyether ketone ketone (PEKK) resin.

8. The fiber-reinforced thermoplastic resin filament according to claim 1, wherein an average value D of a dispersion parameter d (%) of the reinforcing fibers evaluated by the following method is 90% or more:

(i) taking a photograph of a cross section perpendicular to an axial direction of the fiber-reinforced thermoplastic resin filament so that the entire cross section of the filament is taken, (ii) dividing the entire cross-sectional image into square units each having a length of one side defined by equation (2), (iii) calculating dispersion parameter d (%) defined by equation (3), and (iv) repeating the (i)-(iii) at a plurality of locations on the fiber-reinforced thermoplastic resin filament and calculating the average value D of a dispersion parameter d (%)

$$1.5a \leq t \leq 2.5a \text{ (}a\text{: fiber diameter, } t\text{: length of one side of a unit)} \quad (2)$$

$$\text{dispersion parameter } d \text{ (\%)} = \text{number of units each containing } a \text{ reinforcing fiber in an evaluation zone/total number of units each containing any part of the filament in an evaluation zone} \times 100 \quad (3).$$

9. The fiber-reinforced thermoplastic resin filament according to claim 8, wherein a coefficient of variation of a plurality of dispersion parameters d used to calculate the average value D is 4% or less.

10. The fiber-reinforced thermoplastic resin filament according to claim 1, wherein a thermoplastic resin layer is provided in at least a part of an outer periphery of the filament, and a volume ratio of the thermoplastic resin layer present in at least a part of the outer periphery of the filament is 50% or less with respect to the total volume of the fiber-reinforced thermoplastic resin filament.

11. The fiber-reinforced thermoplastic resin filament according to claim 1, wherein the thermoplastic resin is a thermoplastic polymer alloy resin.

12. The fiber-reinforced thermoplastic resin filament according to claim 11, wherein a structural period of the polymer alloy is a both-phase continuous structure of 0.001 to 10 μm, or the polymer alloy contains a polymer alloy forming a sea-island structure comprising a sea phase and an island phase with a particle size of 0.001 to 10 μm.

* * * * *